(12) United States Patent
Krivenok

(10) Patent No.: US 12,457,152 B1
(45) Date of Patent: Oct. 28, 2025

(54) SYSTEM AND METHOD FOR NON-DISRUPTIVE CLUSTER RECONFIGURATION

(71) Applicant: Dell Products L.P., Round Rock, TX (US)

(72) Inventor: Dmitry Krivenok, Dublin (IE)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/645,855

(22) Filed: Apr. 25, 2024

(51) Int. Cl.
*H04L 41/0803* (2022.01)
*H04L 41/122* (2022.01)

(52) U.S. Cl.
CPC ........ *H04L 41/0803* (2013.01); *H04L 41/122* (2022.05)

(58) Field of Classification Search
None
See application file for complete search history.

(56) References Cited

U.S. PATENT DOCUMENTS

2019/0149434 A1* 5/2019 Chou .................. H04L 41/0813
370/254

FOREIGN PATENT DOCUMENTS

CN 105812225 A * 7/2016 ......... H04L 12/4641
KR 20100082169 A * 7/2010

* cited by examiner

*Primary Examiner* — Lance Leonard Barry
(74) *Attorney, Agent, or Firm* — Brian J. Colandreo; Heath M. Sargeant; Holland & Knight LLP

(57) ABSTRACT

A system and method for non-disruptive reconfiguration of cluster networks. The system includes a node having an upper topology including a virtual ethernet device, a lower topology including first and second virtual network devices, and a control plane coupled between the upper and lower topology. Communication between the first virtual network device and the virtual ethernet device is directed through the control plane via a first receive path and a first transmit path. A second receive path from the second virtual network device to the virtual ethernet device is established, such that the virtual ethernet device receives communication from the first and second virtual network devices and the first transmit path is disabled. A second transmit path from the virtual ethernet device to the second virtual network device is established and the first receive path is disabled.

21 Claims, 9 Drawing Sheets

900

```
┌─────────────────────────────────────────────────────────────┐
│ Communication directed between the first virtual network    │
│ device and the virtual ethernet device through the control  │
│ plane via a first receive path from the first virtual       │
│ network device to the virtual ethernet device and a first   │
│ transmit path from the virtual ethernet device to the first │
│ virtual network device                                      │
│ 902                                                         │
└─────────────────────────────────────────────────────────────┘
                              │
                              ▼
┌─────────────────────────────────────────────────────────────┐
│ Second receive path established from the second virtual     │
│ network device to the virtual ethernet device, such that    │
│ the virtual ethernet device is able to receive communication│
│ from the first virtual network device and the second        │
│ virtual network device                                      │
│ 906                                                         │
└─────────────────────────────────────────────────────────────┘
                              │
                              ▼
┌─────────────────────────────────────────────────────────────┐
│ First transmit path from the virtual ethernet device to the │
│ first virtual network device disabled                       │
│ 910                                                         │
└─────────────────────────────────────────────────────────────┘
                              │
                              ▼
┌─────────────────────────────────────────────────────────────┐
│ Second transmit path from the virtual ethernet device to    │
│ the second virtual network device established               │
│ 914                                                         │
└─────────────────────────────────────────────────────────────┘
                              │
                              ▼
┌─────────────────────────────────────────────────────────────┐
│ First receive path from the first virtual network device to │
│ the virtual ethernet device disabled                        │
│ 918                                                         │
└─────────────────────────────────────────────────────────────┘
```

FIG. 9

SYSTEM AND METHOD FOR NON-DISRUPTIVE CLUSTER RECONFIGURATION

BACKGROUND

Modern storage cluster systems may be very complex from network connectivity and features standpoint. Cluster nodes may have just one IGE management port and a small number of FC ports supporting only basic block services; dozens of different ports (25GE, 100GE, 200GE) for different data services such as replication, cloud tiering, block, file, object, etc., and anything in between of the two extreme cases above with ports being dynamically added to the cluster node on demand (after cluster has been initially deployed). However, such changes to the system can be disruptive to the operation of the system, causing downtime and other performance issues.

Data storage network systems available in the market today may require cluster interconnect ports in every cluster node, even for single node/appliance configurations. This is not desirable for many users because it increase the cost of the cluster node. Some systems available in the market today use a dedicated internal cluster interconnect fabric. For such systems the issue of VLAN reconfiguration does not arise because cluster traffic does not flow via the main network fabric. However, the downside of this approach is increased cost of the solution. Some systems available in the market today support tagged cluster traffic, but such systems do not support a change of VLAN (potentially with simultaneous change of the underlying ports) non-disruptively. Typically, this is a change that requires a maintenance window with full downtime of the storage cluster and coordination between storage and network admins.

SUMMARY OF DISCLOSURE

In one example implementation, a system for reconfiguring cluster networks in a non-disruptive manner includes a computer-implemented method, executed on a computing environment including a plurality of interconnected computing devices, comprising, in at least one node including an upper topology including a virtual ethernet device, a lower topology including a first virtual network device and a second virtual network device, and a control plane coupled between the upper topology and the lower topology, wherein the upper topology is decoupled from the lower topology: directing communication between the first virtual network device and the virtual ethernet device through the control plane via a first receive path from the first virtual network device to the virtual ethernet device and a first transmit path from the virtual ethernet device to the first virtual network device; establishing a second receive path from the second virtual network device to the virtual ethernet device, such that the virtual ethernet device is able to receive communication from the first virtual network device and the second virtual network device; disabling the first transmit path from the virtual ethernet device to the first virtual network device; establishing a second transmit path from the virtual ethernet device to the second virtual network device; and disabling the first receive path from the first virtual network device to the virtual ethernet device.

One or more of the following example features may be included. At least one of the first virtual network device and the second virtual network device may include a VLAN. At least one of the first virtual network device and the second virtual network device may include a bond interface. The communication between the upper topology and the lower topology may include tagged traffic. The communication between the upper topology and the lower topology may include untagged traffic. The control plane may include a mirror/redirect function. The control plane may include an extended Berkeley Packet Filter (eBPF) function.

In another example implementation, a system for reconfiguring cluster networks in a non-disruptive manner includes a memory; a computing environment including a plurality of interconnected computing devices; and a processor to: in at least one node including an upper topology including a virtual ethernet device, a lower topology including a first virtual network device and a second virtual network device, and a control plane coupled between the upper topology and the lower topology, wherein the upper topology is decoupled from the lower topology: directing communication between the first virtual network device and the virtual ethernet device through the control plane via a first receive path from the first virtual network device to the virtual ethernet device and a first transmit path from the virtual ethernet device to the first virtual network device; establishing a second receive path from the second virtual network device to the virtual ethernet device, such that the virtual ethernet device is able to receive communication from the first virtual network device and the second virtual network device; disabling the first transmit path from the virtual ethernet device to the first virtual network device; establishing a second transmit path from the virtual ethernet device to the second virtual network device; and disabling the first receive path from the first virtual network device to the virtual ethernet device.

One or more of the following example features may be included. At least one of the first virtual network device and the second virtual network device may include a VLAN. At least one of the first virtual network device and the second virtual network device may include a bond interface. The communication between the upper topology and the lower topology may include tagged traffic. The communication between the upper topology and the lower topology may include untagged traffic. The control plane may include a mirror/redirect function. The control plane may include an extended Berkeley Packet Filter (eBPF) function.

In another example implementation a computer program product residing on a non-transitory computer readable medium having a plurality of instructions stored thereon which, when executed by a processor, cause the processor to perform operations comprising: in at least one node including an upper topology including a virtual ethernet device, a lower topology including a first virtual network device and a second virtual network device, and a control plane coupled between the upper topology and the lower topology, wherein the upper topology is decoupled from the lower topology: directing communication between the first virtual network device and the virtual ethernet device through the control plane via a first receive path from the first virtual network device to the virtual ethernet device and a first transmit path from the virtual ethernet device to the first virtual network device; establishing a second receive path from the second virtual network device to the virtual ethernet device, such that the virtual ethernet device is able to receive communication from the first virtual network device and the second virtual network device; disabling the first transmit path from the virtual ethernet device to the first virtual network device; establishing a second transmit path from the virtual ethernet device to the second virtual network device; and disabling the first receive path from the first virtual network device to the virtual ethernet device.

One or more of the following example features may be included. At least one of the first virtual network device and the second virtual network device may include a VLAN. At least one of the first virtual network device and the second virtual network device may include a bond interface. The communication between the upper topology and the lower topology may include tagged traffic. The communication between the upper topology and the lower topology may include untagged traffic. The control plane may include a mirror/redirect function. The control plane may include an extended Berkeley Packet Filter (eBPF) function.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 9 is an example flowchart of the process for non-disruptive cluster configuration according to one or more example implementations of the disclosure.

Like reference symbols in the various drawings indicate like elements.

DETAILED DESCRIPTION

Figure 1:
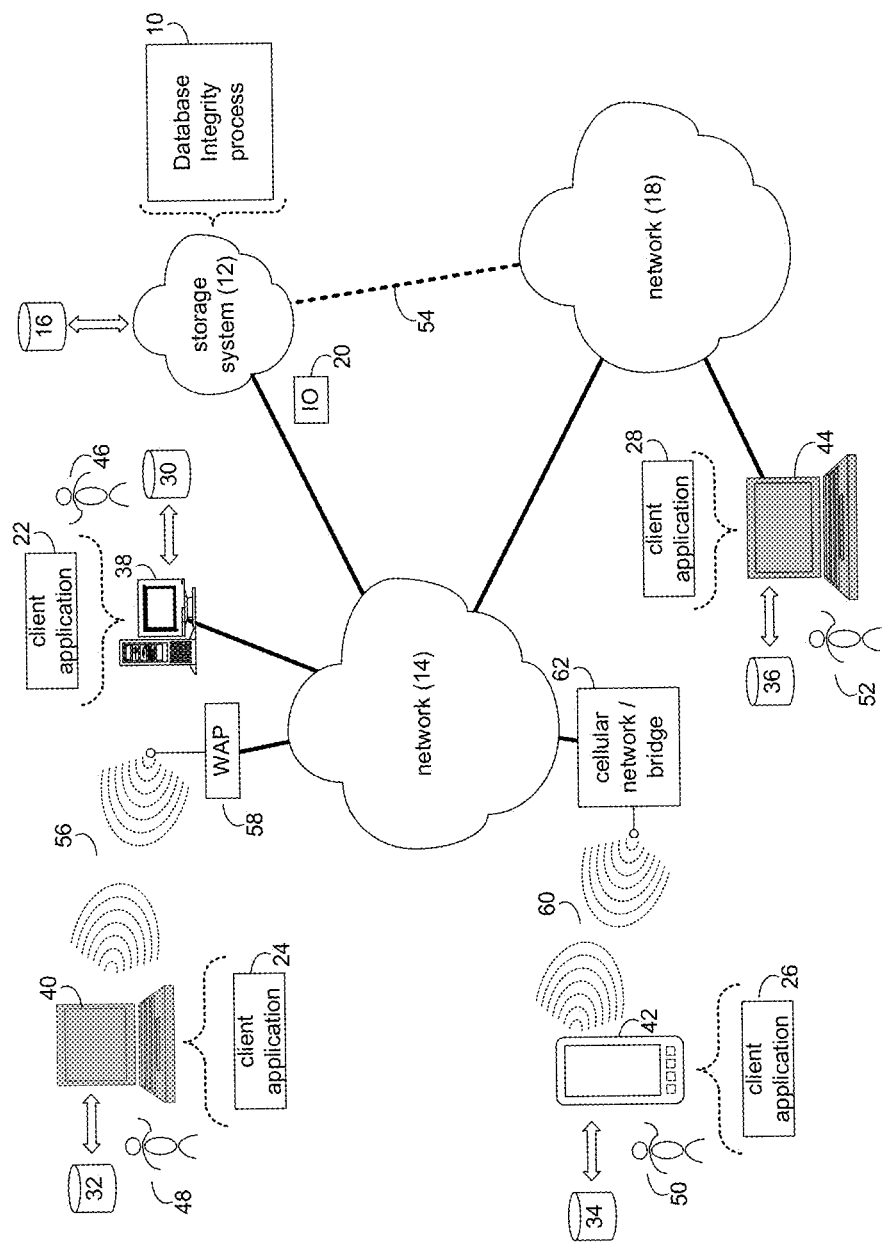
FIG. 1 is an example diagrammatic view of a storage system and a database integrity maintenance process coupled to a distributed computing network according to one or more example implementations of the disclosure.

System Overview:

Referring to FIG. 1, there is shown database integrity maintenance process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of disability access assistance process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of disability access assistance process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data deduplication process, such as virtual entry lifetime expansion process 10 of FIG. 1, may include but is not limited to, monitoring a deduplication function of a virtual layer of a data storage system, incrementing a reference count of a virtual entry when a data page is written to the virtual layer, decrementing the reference count of the virtual entry when a data page is deleted from the virtual layer, maintaining the virtual entry in the virtual layer when the reference count reaches a predetermined value, and reclaiming the virtual entry when a predetermined action of the data storage system is to be performed.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Non-Disruptive Cluster Reconfiguration System and Process

Figure 2:
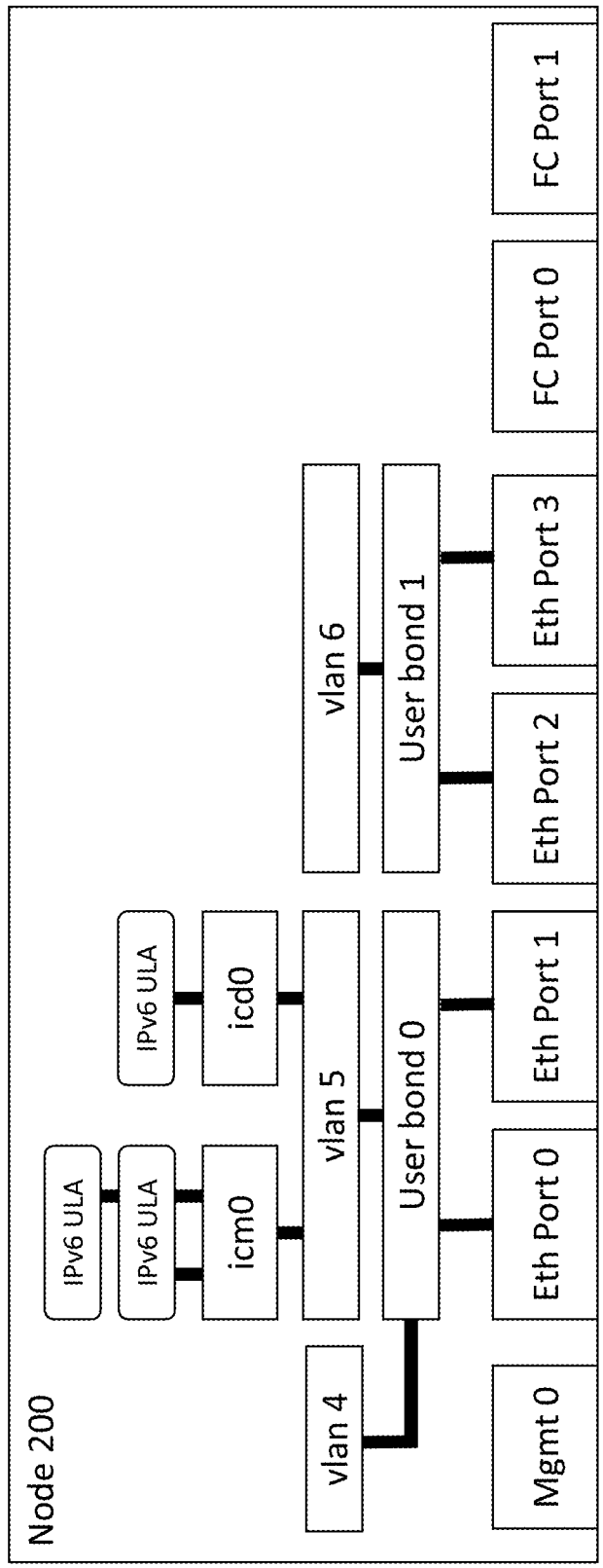
FIG. 2 is an example depiction of a prior art storage cluster node.

FIG. 2 is a graphical representation of a prior art node 200 of a system for maintaining database integrity of a data storage system. System 200 includes a management port, 2 FC ports and 4 Ethernet ports. Cluster traffic typically does not support native multipathing for high-availability (HA) and therefore network-level HA is provided by means of bond interfaces (e.g., LACP or active/passive bonds). On top of a bond, different logical network devices such as Linux macvlan or ipvlan devices which host actual IPv6 ULA addresses my be used for cluster traffic between nodes. System 200 includes, for example, two interfaces-icm0 (intra-cluster management) and icd0 (intra-cluster data), but there may be any number of cluster networks in a particular storage cluster.

System 200 comprises a topology where user asks the cluster node to configure multiple bonds on different NIC ports and attaches cluster networks to VLAN 5 on top of the first bond. All links between logical network devices are "hard" links which means icm0 cannot be moved to a different bond or insert VLAN between icm0 and bond0 without breaking the network device hierarchy and impacting the cluster traffic.

Figure 3:
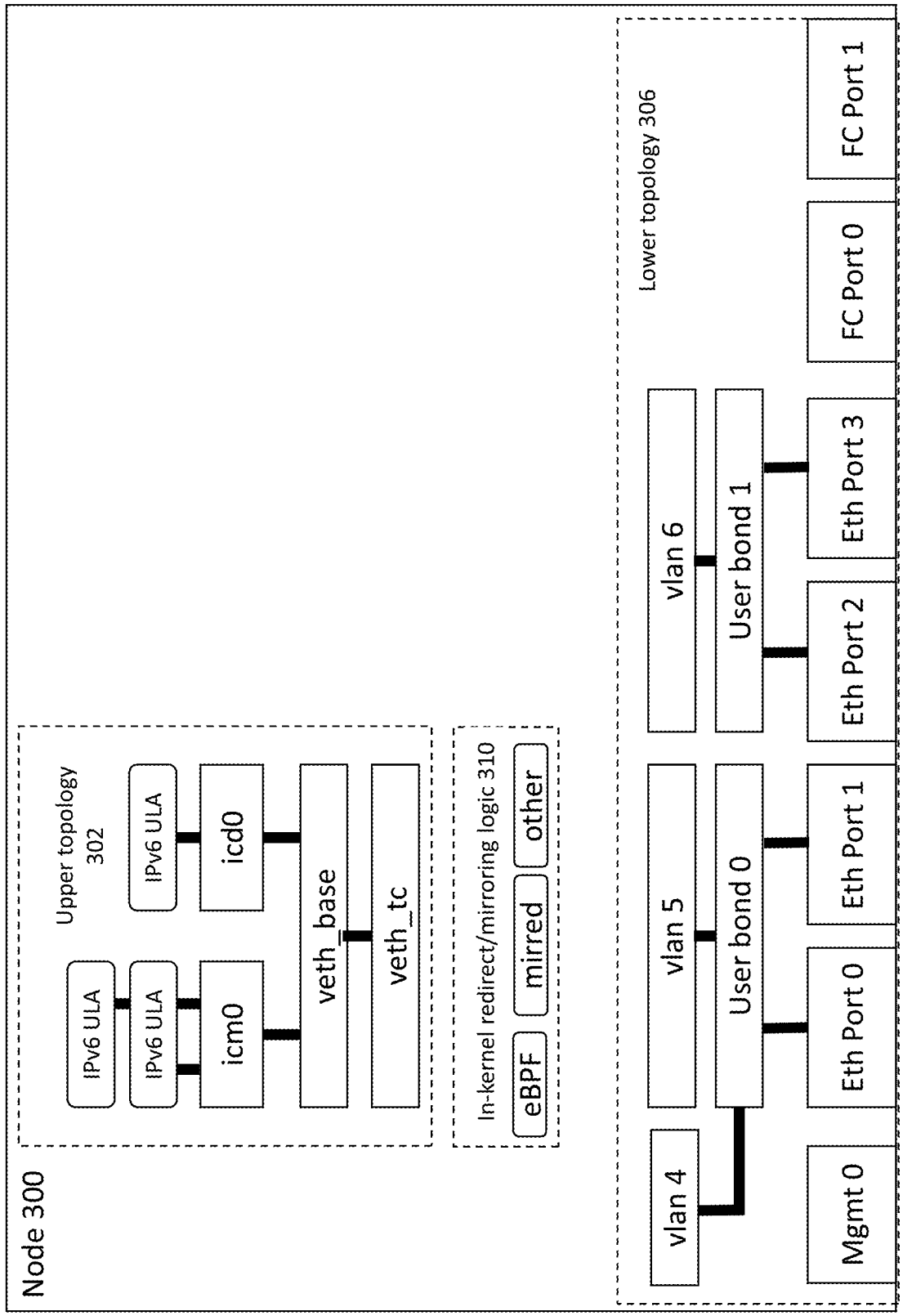
FIG. 3 is an example depiction of a system and process for non-disruptive cluster configuration according to one or more example implementations of the disclosure.

FIG. 3 is an example depiction of a system and process for non-disruptive cluster configuration according to one or more example implementations of the disclosure. Node 300 includes an upper topology 302, a lower topology 306, and a control plane 310.

Upper topology 302 is fully decoupled from the lower topology 306 and may be created even if cluster node has no ethernet ports at all. No hard links exist between upper and lower topologies. In an implementation of the disclosure, node 300 includes a driver, e.g., the Linux virtual ethernet pair. The main advantage of this virtual device is that it allows to easily attach filters to ingress of the lower veth_tc interface. Another advantage is that veth_base may be moved to a different network namespace, for example if the clustering stack runs in a separate container. In FIG. 3, veth_tc and veth_base are names of virtual ethernet pair devices.

Cluster network interfaces such as icm0 and icd0 are configured on top of the veth_base virtual interface and provide access to IPv6 unique local addresses (ULA). Several different types of drivers may be used to implement the cluster network interfaces, such as the mac VLAN driver.

Lower topology 306 is user configurable, and may consist of a stack of devices including VLAN virtual network device(s), bond virtual network devices, and one or more (if bonded) physical ports. This structure is simple but flexible and allows to support VLAN tagged and untagged cluster traffic as well as configurations with and without network HA. At cluster formation or expansion time, this lower hierarchy may be created trivially from the bottom to the top. As discussed in greater detail below, implementations of the disclosure are directed to reconfiguring the lower topology 306 non-disruptively with respect to the upper topology 302.

A bond interface, also known as a network bond or bonding interface, is a virtual network interface in computer networking that combines multiple physical network interfaces into a single logical interface. This aggregation of physical interfaces creates a higher-bandwidth and fault-tolerant connection, providing increased network performance, redundancy, and reliability.

The bond interface operates at the data link layer of the OSI model and is commonly implemented using bonding or link aggregation technologies, such as the IEEE 802.3ad Link Aggregation Control Protocol (LACP) or Linux bonding driver. These technologies enable network administrators to group together two or more physical network interfaces, such as Ethernet ports, into a single bond interface.

Once configured, the bond interface appears to the operating system and network applications as a single network interface with its own unique MAC (Media Access Control) address and IP (Internet Protocol) address. Traffic sent and received through the bond interface is distributed across the member physical interfaces using various load-balancing algorithms, ensuring efficient utilization of available bandwidth and improved network performance.

One of the key benefits of using a bond interface is its ability to provide fault tolerance and high availability. If one of the member interfaces fails or becomes unavailable, the bond interface can automatically fail over to the remaining active interfaces, ensuring uninterrupted network connectivity and minimizing downtime.

Bond interfaces are commonly used in scenarios where high network throughput, reliability, and redundancy are critical requirements, such as server clusters, storage area networks (SANs), or high-performance computing environments. They enable organizations to achieve scalable and resilient network architectures while leveraging existing network infrastructure and maximizing network utilization.

Figure 4:
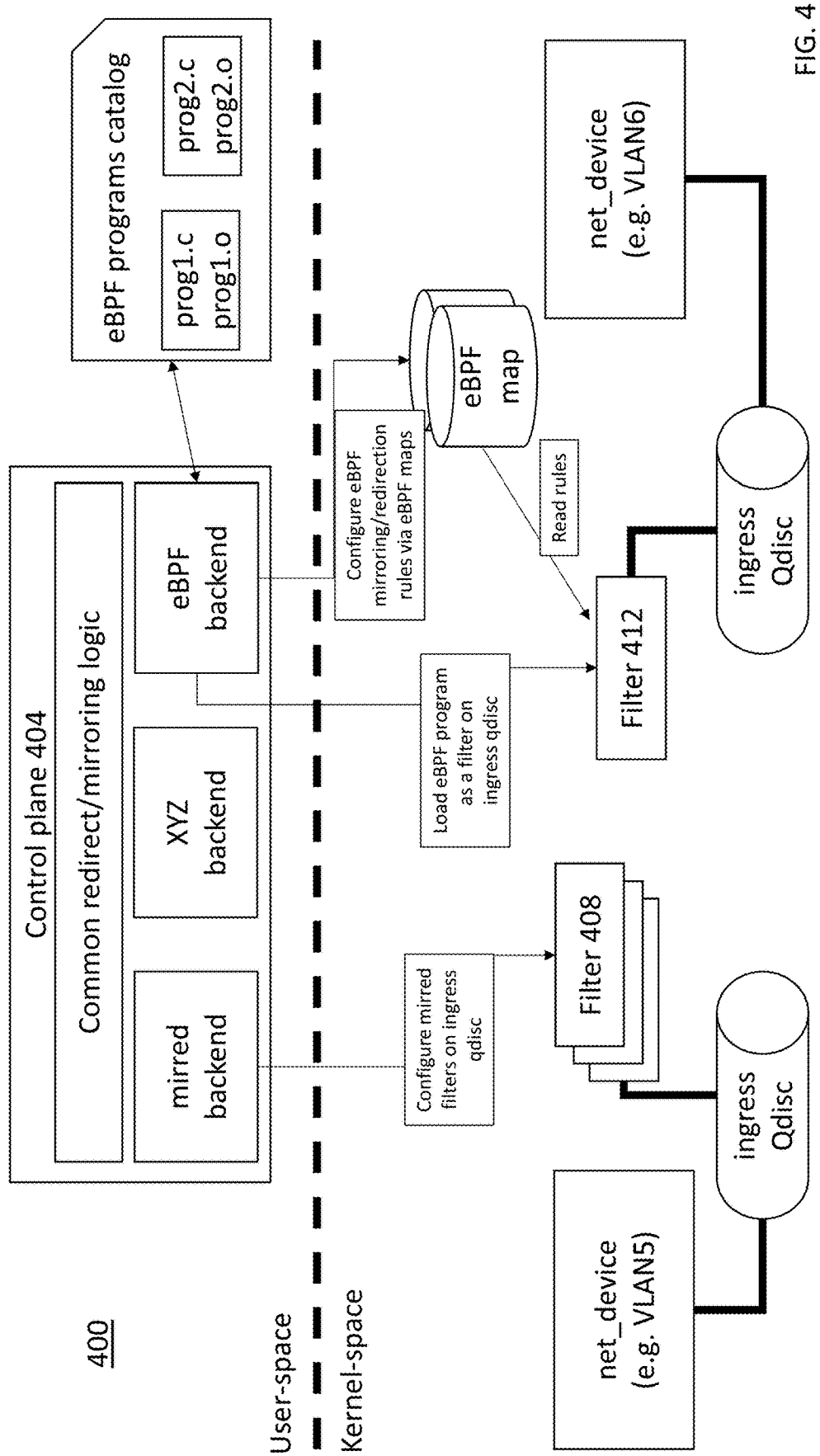
FIG. 4 is an example depiction of a control plane portion of a system and process for non-disruptive cluster configuration according to one or more example implementations of the disclosure.

In an implementation, upper topology 302 and lower topology 306 are not connected via any hard links. As shown in FIG. 4, for traffic to flow between them, a traffic mirroring and redirection engine 400 is used. This engine 400 is going to have user-space control plane 404 and one or more kernel-space filters 408, 412 implementing the network I/O path. Each network device in Linux supports ingress and egress queueing disciplines (qdiscs). Ingress qdiscs support basic filtering operations, intelligently redirect and mirror traffic between network devices. This may be implemented via kernel-space filters such as mirred, custom eBPF programs, or other implementations. The only requirement is to be able to attach a filter to ingress qdisc of the network interface and comply with kernel API.

An ingress qdisc (queueing discipline) is a component of the Linux kernel's network stack responsible for managing the incoming traffic to a network interface. Specifically, it controls the queuing and scheduling of packets as they arrive at the network interface from external sources, such as other network devices or the internet.

The primary purpose of an ingress qdisc is to enforce traffic management policies and quality of service (QOS) parameters on incoming packets, ensuring that they are handled in a fair, efficient, and prioritized manner. This may involve prioritizing certain types of traffic over others, applying rate limiting or bandwidth shaping to prevent congestion, or implementing traffic filtering and classification to enforce network policies or security measures.

Ingress qdiscs operate at the ingress point of the network interface, meaning they are responsible for processing packets before they are forwarded to the rest of the networking stack for further processing and routing. This allows them to have a direct impact on the behavior and performance of the network interface and the overall network traffic flow.

In Linux systems, ingress qdiscs are typically configured using the 'tc' (Traffic Control) command-line utility or other network management tools. Administrators can define various queuing disciplines and parameters to customize the behavior of the ingress qdisc according to the specific requirements of the network environment.

"Mirred" refers to the MirrorREDirection action, which is a mechanism used in Linux-based systems for traffic redirection and monitoring. Mirroring allows network administrators to replicate network traffic from one network interface to another for purposes such as monitoring, analysis, or security inspection.

When the Mirrored action is applied to a network interface or a network bridge in Linux, it causes incoming or outgoing traffic on that interface to be duplicated and forwarded to another destination interface or bridge. This destination interface or bridge is often referred to as the "mirror port" or "monitor port."

Mirroring is commonly used in network monitoring and analysis scenarios where it's necessary to capture and inspect network traffic without interrupting the normal flow of data. By mirroring traffic from one or more network segments to a monitoring device or tool, administrators can analyze network performance, detect anomalies or security threats, troubleshoot network issues, and ensure compliance with network policies and regulations.

In Linux-based systems, the mirred action can be configured and managed using utilities such as 'tc' (Traffic Control) or 'iproute2', which provide mechanisms for manipulating network traffic and implementing advanced networking features. By leveraging mirroring capabilities, administrators can gain valuable insights into network behavior and performance, enabling them to optimize network infrastructure and ensure the integrity and security of network communications.

eBPF, or Extended Berkeley Packet Filter, is a powerful and versatile technology in the Linux kernel that enables efficient programmability and dynamic packet processing within the kernel space. Originally developed as an extension to the traditional Berkeley Packet Filter (BPF) framework, eBPF significantly expands the capabilities of BPF by allowing user-defined programs to be executed directly within the kernel, enabling a wide range of advanced networking, security, and monitoring applications.

One of the key features of eBPF is its ability to execute sandboxed and safe programs within the kernel without compromising system stability or security. eBPF programs are written in a restricted instruction set and are subject to strict verification and validation before they are allowed to run, ensuring that they cannot cause system crashes or security vulnerabilities.

eBPF programs can be attached to various hook points or events within the kernel, such as network sockets, system calls, or tracepoints, allowing them to intercept, inspect, and modify system behavior in real-time. This enables a wide range of use cases, including packet filtering and firewalling, traffic shaping and load balancing, network monitoring and analysis, security policy enforcement, and performance profiling and optimization.

Outgoing cluster traffic is handled trivially in an example implementation. All traffic leaving the upper topology 302 via veth_tc network device is unconditionally redirected to the top of the lower topology 306. Below is how this may be implemented with the mirred filter:

sudo the qdisc add dev veth_tc handle ffff: ingress
sudo to filter add dev veth_tc parent ffff: matchall skip_hw action mirred egress redirect dev SIE Even though the outgoing traffic is being redirected, the filter 408, 412 is attached to ingress qdisc of the veth_tc device. The only variable part here is which interface to redirect traffic to. Depending on the configuration of the lower hierarchy it will point to one of those:

VLAN network device if tagged cluster traffic was requested by the user
Bond interface for untagged cluster traffic with network HA
Individual port for untagged cluster traffic without network HA Control plane 404 is aware of both network hierarchies and configures the kernel space filters via user-space tools or netlink interface.

Incoming cluster traffic handling is more complicated. The filter 408, 412 needs to be attached to the top of the lower topology 306, but it needs to selectively redirect or mirror traffic to veth_tc interface depending on the type of traffic. First, broadcast and multicast traffic is mirrored to the veth_tc interface. Broadcast and multicast traffic is not redirected because other network devices on top of the lower topology may want to consume it. Secondly, packets directed specifically to the upper topology 302 are redirected. This may be done by matching MAC addresses of icm0/icd0 interfaces or by matching IPv6 ULA addresses via mechanisms like IP sets. An example below demonstrates how this may be achieved via the mirred filter using ipset.

sudo tc qdisc add dev $IF handle ffff: ingress
sudo tc filter and dev eth0 parent ffff: protocol all u32 match exptu8 at 0 layer link mask 0x1 eq 0x1 action mirred egress mirror dev veth_tc
sudo tc filter and dev $IF parent ffff: basic match 'ipset (icm_v6 dst)' action mirred egress redirect dev veth_tc
sudo tc filter add dev $IF parent ffff: basic match 'ipset (icd_v6 dsh)' action mirred egress redirect dev veth_tc The next part of the incoming traffic handling is propagation of MAC addresses from the upper topology 302 to the lower topology 306. This must be done because there are no hard links between those topologies and standard propagation mechanisms will not work. At least unicast MAC addresses of icm0/icd0 interfaces must be propagated to the bottom of the lower topology. This may be required for the NIC to pass the received frame with icm0/icd0 destination MAC up to the kernel. Below is an example of how this may be achieved:

sudo bridge fdb add <ICM0_MAC> dev $PORT3
sudo bridge fdb add <ICD0_MAC> dev $PORT3
sudo bridge fdb add <ICM0_MAC> dev $PORT2
sudo bridge fdb add <ICD0_MAC> dev $PORT2

Figure 5:
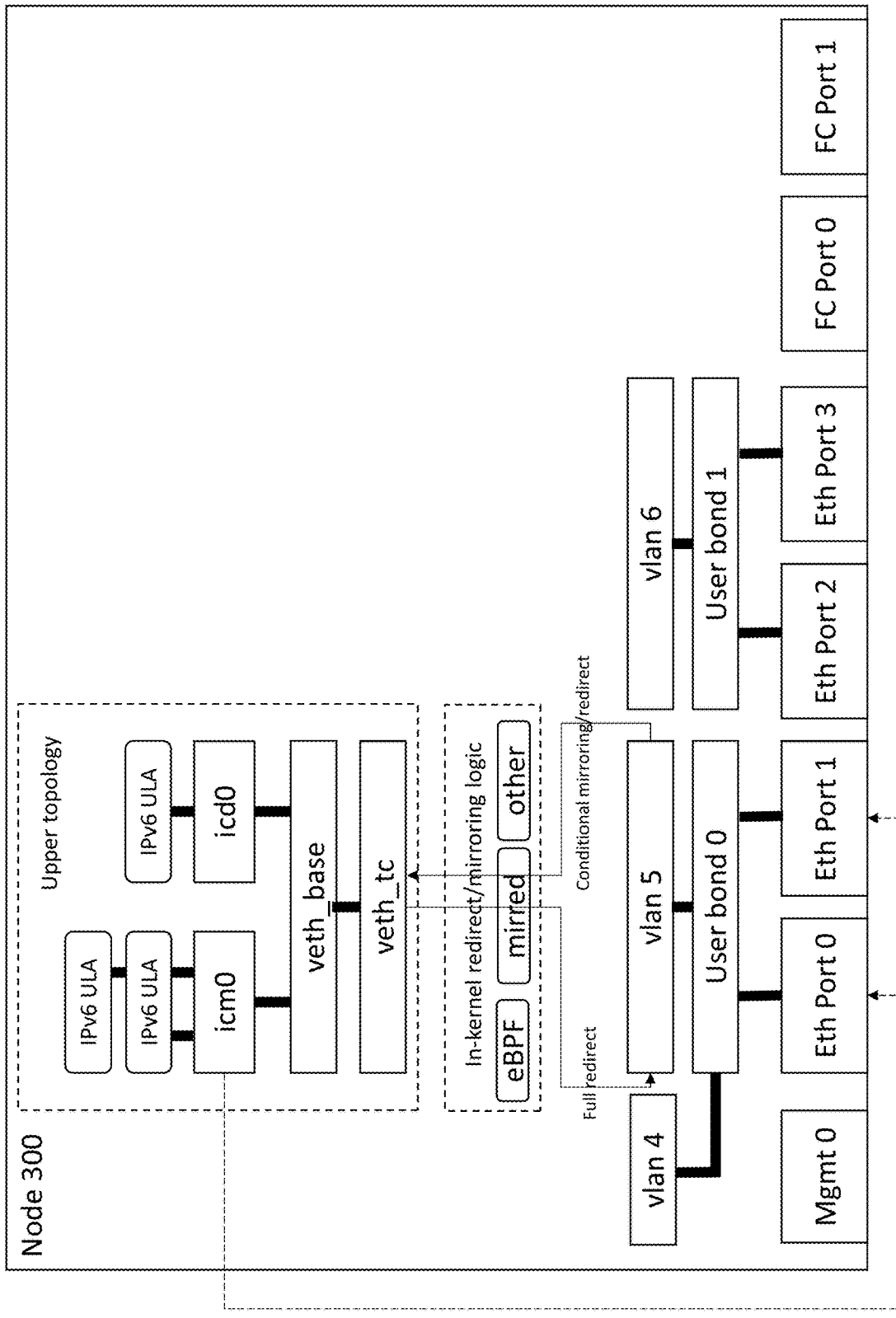
FIGS. 5-8 are further example depictions of a control plane portion of a system and process for non-disruptive cluster configuration according to one or more example implementations of the disclosure.

Referring now to FIGS. 5-9 an example implementation of the method for non-disruptive cluster reconfiguration will be further described. In this example, the cluster network will be switched from VLAN 5 on bond0 to VLAN 6 on bond 1 non-disruptively. FIG. 5 shows the original I/O path, in which traffic flows between upper topology 302 and lower topography 306 through VLAN 5.

The first step is to configure conditional traffic mirroring and redirection from the lower topology 306 to the upper topology 302 of network devices. This is performed by the control plane 404 and the kernel-space filter 408, 412. The key here is that this step is executed on all cluster nodes. Note that during and after the execution of the first step, the traffic flows through the original I/O path like no change was done at all. This is very important, and it allows first step to take more time if required and to ensure that all cluster nodes go through any recovery steps if any unrelated failures occur during the process. This also allows to perform validation of network connectivity between nodes via the new lower hierarchy without disruption to the production traffic—this can be done by generating another IPv6 ULA prefix and performing inter-node communication checks.

Figure 6:
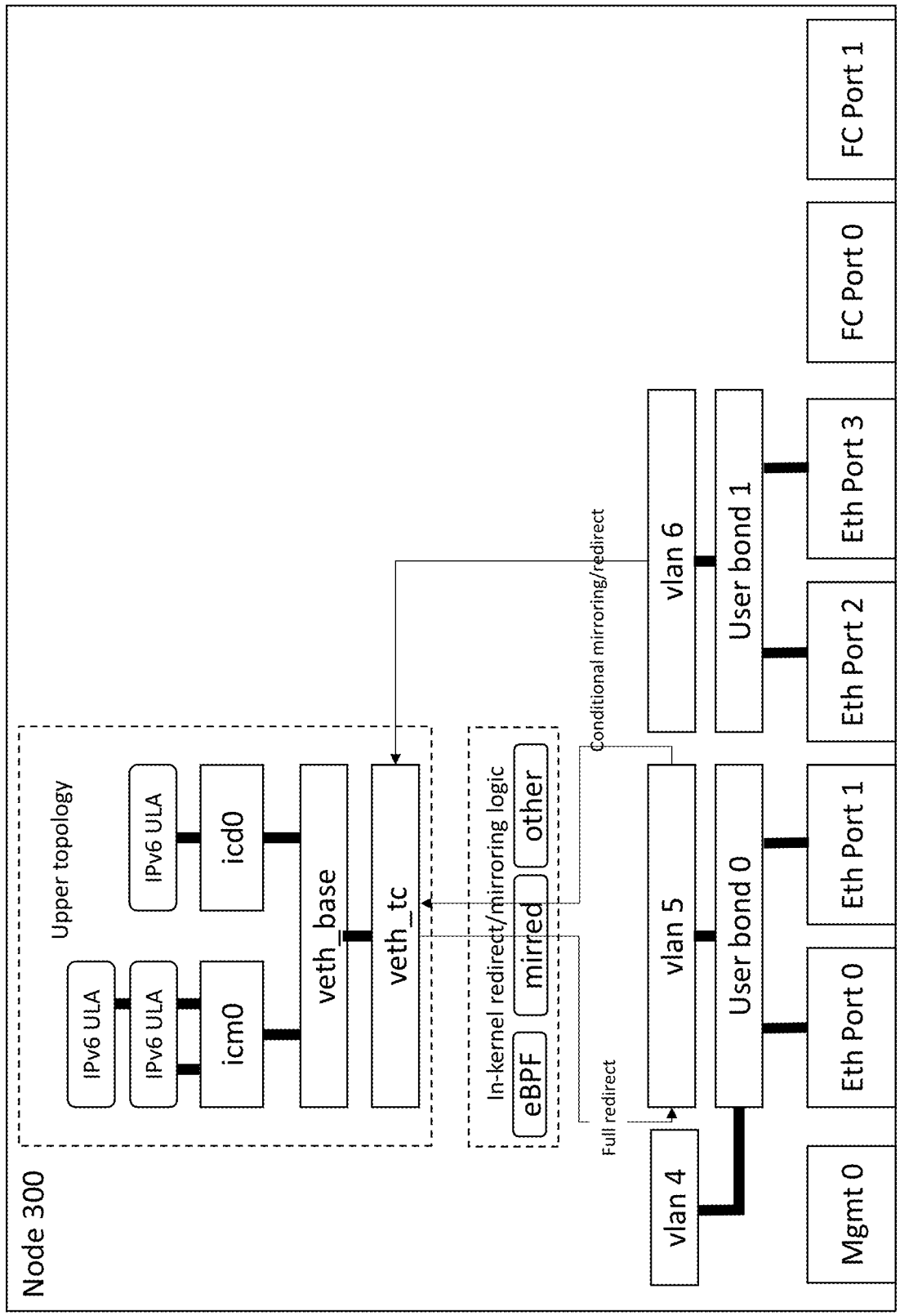

The next step in the process is to reconfigure upper topology to lower topology redirection on all nodes one by one. The control plane 404 replaces the filter attached to ingress qdisc of veth_tc network device with a new one which points to the top of the new lower hierarchy. Note that the cluster node which executed this step will send traffic via the new I/O path (VLAN 6) but may receive traffic via either new or old I/O path (VLAN 5). This is shown in FIG. 6, in which, in addition to VLAN 5, veth_tc of upper topology 302 is configured to also receive traffic from VLAN 6. Every other cluster node is guaranteed to receive traffic via both the original VLAN (VLAN 5) and the new VLAN (VLAN 6), so it's safe to switch I/O path on the current node as described above. Also, as was mentioned above, the upper topology has no knowledge of VLANs at all. It does not matter if a packet arrived via the original lower topology or via the new lower topology—it will be delivered regardless of the path through which it is received.

Figure 7:
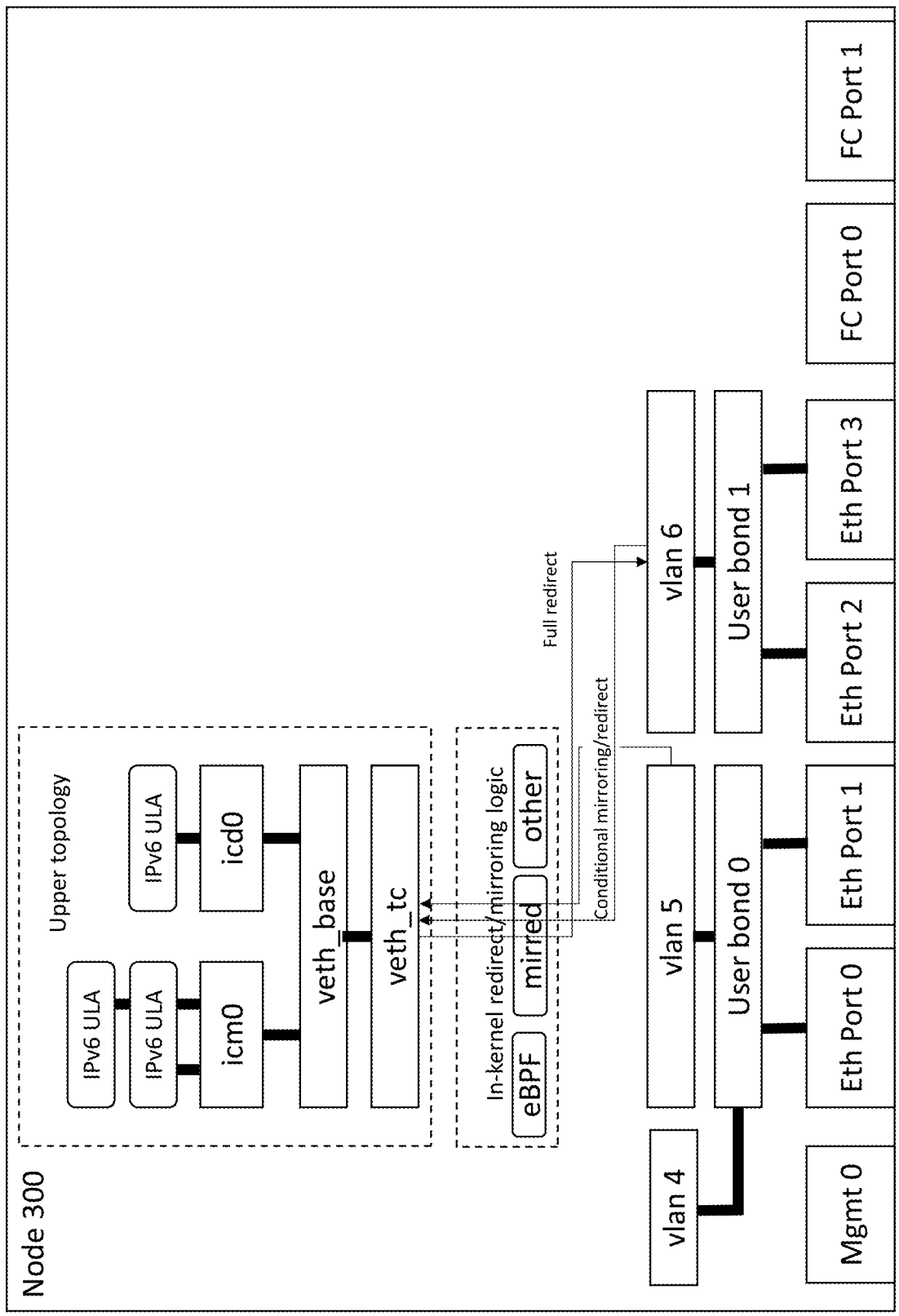
Figure 8:
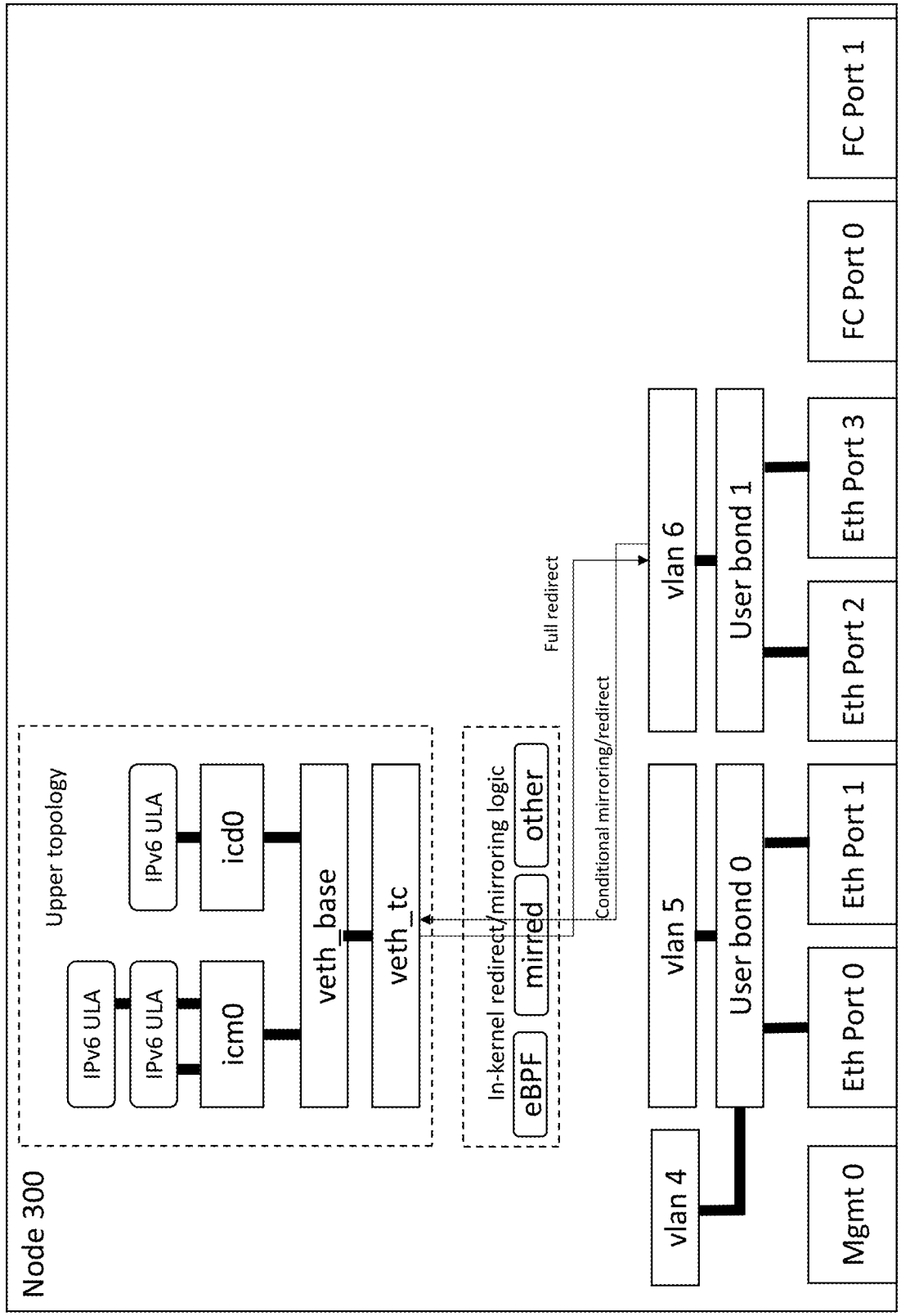

The next step of the process is executed on all cluster nodes—the original I/O path is fully deactivated by the control plane 404. It does so by removing the filter from the top of the original lower topology. This step may be executed in any order, sequentially or concurrently on all cluster nodes. FIG. 7 shows the system with the redirect path between VLAN 5 and veth_tc removed. At the end of this step all cluster nodes will be configured as shown in FIG. 8, in which the reconfiguration of the system from VLAN 5 to VLAN 6 is complete.

The system and method described above may be utilized in the reconfiguration of different types of network systems. The table below covers different reconfiguration scenarios which may happen in practice. It assumes bonds will be used for network HA. Non-HA configurations will be covered similarly.

| # | Current configuration | New configuration | Notes |
|---|---|---|---|
| 1 | VLAN X on bond0 | VLAN Y on bond0 | Same bond, only VLAN change |
| 2 | VLAN X on bond0 | Untagged on bond0 | |
| 3 | VLAN X on bond0 | VLAN X on bond1 | Different bond with the same or different VLAN |
| 4 | VLAN X on bond0 | VLAN Y on bond1 | |
| 5 | VLAN X on bond0 | Untagged on bond1 | |
| 6 | Untagged on bond0 | VLAN X on bond0 | Same bond, enable VLAN |
| 7 | Untagged on bond0 | VLAN X on bond1 | Different bond, with or without VLAN |
| 8 | Untagged on bond0 | Untagged on bond1 | |
| 9 | Any on bond0 over P1-P2 | Any on bond0 over P1-P4 | 2-port bond to 4-port bond |

Whenever a reconfiguration is performed from one bond to another bond or to add more ports to the existing bond (case #9), icm0/icd0 MAC addresses are propagated to the new ports as described above and shown in FIG. 5. Similarly, icm0/icd0 MAC addresses from the UC list are removed from ports which are no longer used by the I/O path. Further, when moving between tagged and untagged configurations on the same bond the filters need to be attached to ingress qdisc of both the bond and VLAN interface configured on top of it. The filter configuration on the bond device must only mirror packets without VLAN tag. This is important because ingress qdisc is processed before the VLAN in the receive flow and tagged frames should not be redirected to the upper hierarchy.

Unlike some other approaches which use a bridge device to connect network device topologies, this implementation is will be loop-free when it comes to broadcast traffic because traffic received via the original lower hierarchy is always delivered locally and is never forwarded back via the new lower hierarchy.

FIG. 9 is an example flowchart 900 of the process for non-disruptive cluster configuration according to one or more example implementations of the disclosure. In task 902, communication is directed between the first virtual network device and the virtual ethernet device through the control plane via a first receive path from the first virtual network device to the virtual ethernet device and a first transmit path from the virtual ethernet device to the first virtual network device. A second receive path established from the second virtual network device to the virtual ethernet device, such that the virtual ethernet device is able to receive communication from the first virtual network device and the second virtual network device, 906. The first transmit path from the virtual ethernet device to the first virtual network device is disabled, 910, and a second transmit path from the virtual ethernet device to the second virtual network device is established, 914. The first receive path from the first virtual network device to the virtual ethernet device is then disabled, 918, thereby enabling the reconfiguration of the node from communicating through the first virtual network device to the second virtual network device with no disruption to the traffic flowing through the node.

Accordingly, implementations of the disclosure provide a system and method for non-disruptively reconfiguring data storage clusters. It allows an upper topology of network devices and all IPv6 ULA addresses to be configured from day 0 even on single node clusters without physical ports, i.e., a single cluster networking design needs to be implemented and maintained. No physical ports for clustering are required for single node configuration, so the initial cost of the node will be lower. The system enables a user to define which ports should be used for clustering traffic on per-node basis when cluster expansion is done. Cluster nodes do not have to be fully homogeneous and different NICs and NIC ports may be used on different cluster nodes if desired. The system allows the connection of the upper topology to any lower topology of network devices. The system enables fully non-disruptive reconfiguration of the lower topology of network devices, including changing VLANs, switching between tagged to untagged configurations, and changing physical ports and bonds, or all of those concurrently. The system does not depend on the changes to be orchestrated on all nodes quickly and simultaneously and may tolerate node failures during the orchestration of the reconfiguration. The system does not impact other traffic using the same ports or bonds. Traffic mirroring and redirection is restricted to the cluster traffic and other traffic may work as before via the hard links. Unlike bridge-based approaches, this system is loop-free when it comes to handling broadcast traffic.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing environment including a plurality of interconnected computing devices, comprising:
   in at least one node including an upper topology including a virtual ethernet device, a lower topology including a first virtual network device and a second virtual network device, and a control plane coupled between the upper topology and the lower topology, wherein the upper topology is decoupled from the lower topology:
   directing communication between the first virtual network device and the virtual ethernet device through the control plane via a first receive path from the first virtual network device to the virtual ethernet device and a first transmit path from the virtual ethernet device to the first virtual network device;
   establishing a second receive path from the second virtual network device to the virtual ethernet device, such that the virtual ethernet device is able to receive communication from the first virtual network device and the second virtual network device;
   disabling the first transmit path from the virtual ethernet device to the first virtual network device;
   establishing a second transmit path from the virtual ethernet device to the second virtual network device; and
   disabling the first receive path from the first virtual network device to the virtual ethernet device.

2. The method of claim 1, wherein at least one of the first virtual network device and the second virtual network device comprises a VLAN.

3. The method of claim 1, wherein at least one of the first virtual network device and the second virtual network device comprises a bond interface.

4. The method of claim 2 wherein the communication between the upper topology and the lower topology comprises tagged traffic.

5. The method of claim 3 wherein the communication between the upper topology and the lower topology comprises untagged traffic.

6. The method of claim 1, wherein the control plane comprises a mirror/redirect function.

7. The method of claim 1, wherein the control plane comprises an extended Berkeley Packet Filter (eBPF) function.

8. A computing system comprising:
   a memory;
   a computing environment including a plurality of interconnected computing devices; and
   a processor to:
   in at least one node including an upper topology including a virtual ethernet device, a lower topology including a first virtual network device and a second virtual network device, and a control plane coupled between the upper topology and the lower topology, wherein the upper topology is decoupled from the lower topology:
   direct communication between the first virtual network device and the virtual ethernet device through the control plane via a first receive path from the first virtual network device to the virtual ethernet device and a first transmit path from the virtual ethernet device to the first virtual network device;
   establish a second receive path from the second virtual network device to the virtual ethernet device, such that the virtual ethernet device is able to receive communication from the first virtual network device and the second virtual network device;
   disable the first transmit path from the virtual ethernet device to the first virtual network device;
   establish a second transmit path from the virtual ethernet device to the second virtual network device; and
   disable the first receive path from the first virtual network device to the virtual ethernet device.

9. The system of claim 8, wherein at least one of the first virtual network device and the second virtual network device comprises a VLAN.

10. The system of claim 8, wherein at least one of the first virtual network device and the second virtual network device comprises a bond interface.

11. The system of claim 9 wherein the communication between the upper topology and the lower topology comprises tagged traffic.

12. The system of claim 10 wherein the communication between the upper topology and the lower topology comprises untagged traffic.

13. The system of claim 8, wherein the control plane comprises a mirror/redirect function.

14. The method of claim 8, wherein the control plane comprises an extended Berkeley Packet Filter (eBPF) function.

15. A computer program product residing on a non-transitory computer readable medium having a plurality of instructions stored thereon which, when executed by a processor, cause the processor to perform operations comprising:
   in at least one node including an upper topology including a virtual ethernet device, a lower topology including a first virtual network device and a second virtual network device, and a control plane coupled between the upper topology and the lower topology, wherein the upper topology is decoupled from the lower topology:
   directing communication between the first virtual network device and the virtual ethernet device through the control plane via a first receive path from the first virtual network device to the virtual ethernet device and a first transmit path from the virtual ethernet device to the first virtual network device;

establishing a second receive path from the second virtual network device to the virtual ethernet device, such that the virtual ethernet device is able to receive communication from the first virtual network device and the second virtual network device;

disabling the first transmit path from the virtual ethernet device to the first virtual network device;

establishing a second transmit path from the virtual ethernet device to the second virtual network device; and disabling the first receive path from the first virtual network device to the virtual ethernet device.

16. The method of claim 15, wherein at least one of the first virtual network device and the second virtual network device comprises a VLAN.

17. The method of claim 15, wherein at least one of the first virtual network device and the second virtual network device comprises a bond interface.

18. The method of claim 16 wherein the communication between the upper topology and the lower topology comprises tagged traffic.

19. The method of claim 17 wherein the communication between the upper topology and the lower topology comprises untagged traffic.

20. The method of claim 15, wherein the control plane comprises a mirror/redirect function.

21. The method of claim 15, wherein the control plane comprises an extended Berkeley Packet Filter (eBPF) function.

* * * * *